March 31, 1970     S. M. OSTHAGEN ET AL     3,503,400
URETHRAL VALVE
Filed July 12, 1967     3 Sheets-Sheet 1
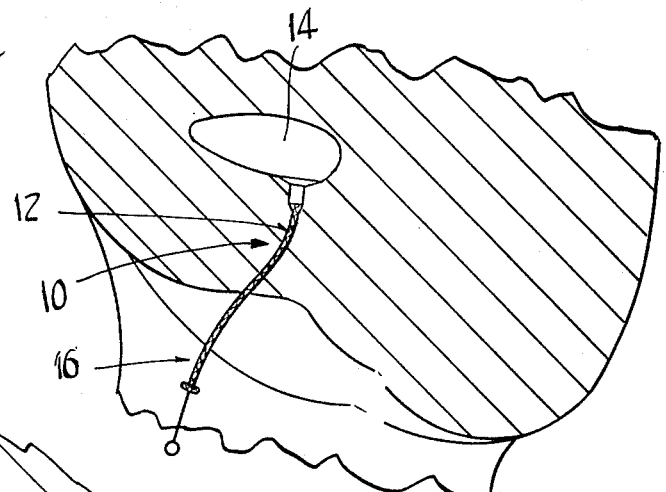
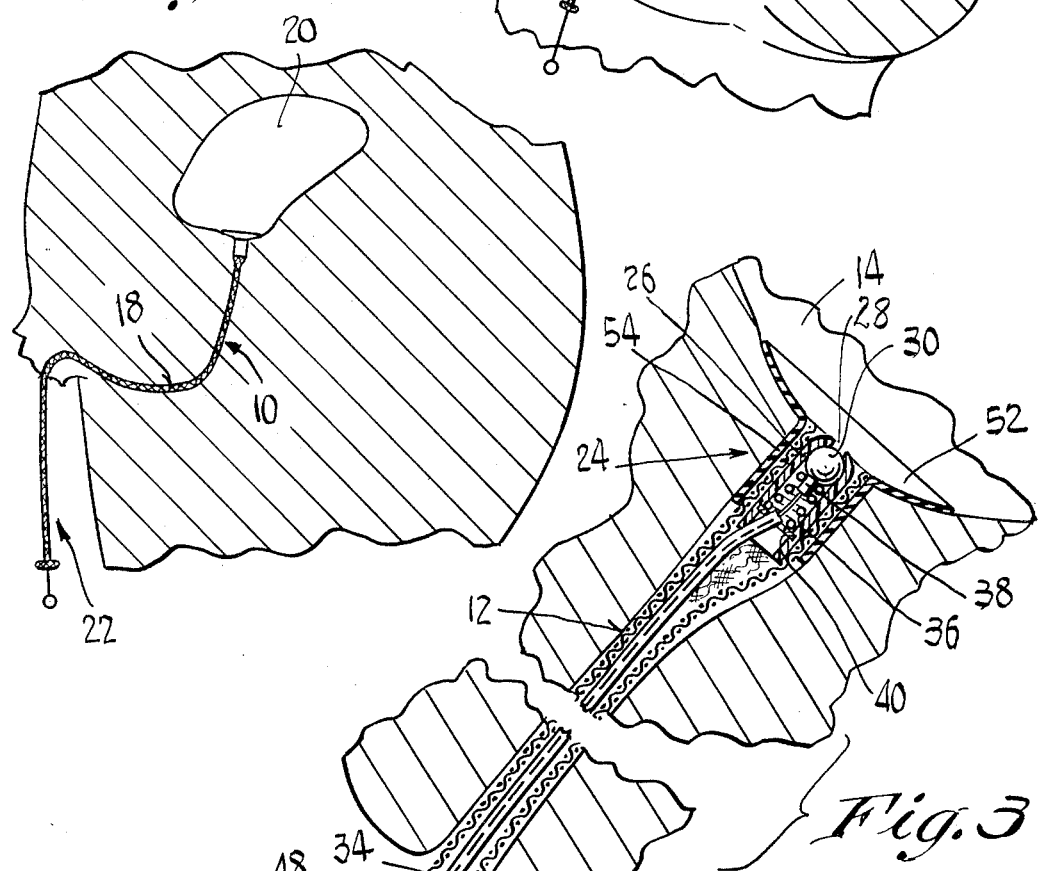
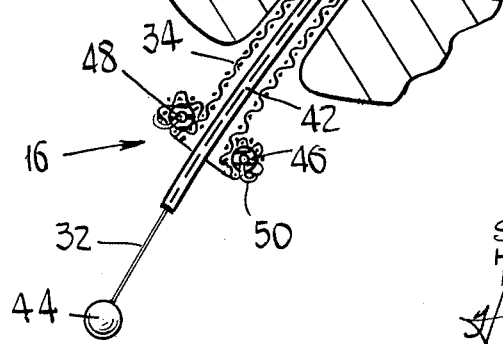
INVENTORS
Sven M. Osthagen
Henry M. Wise, Jr
AGENT

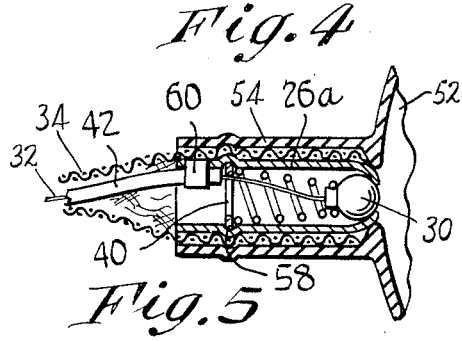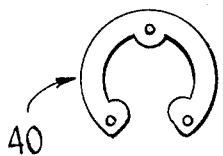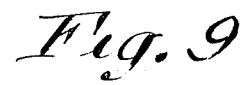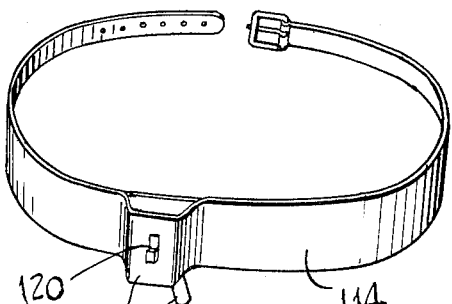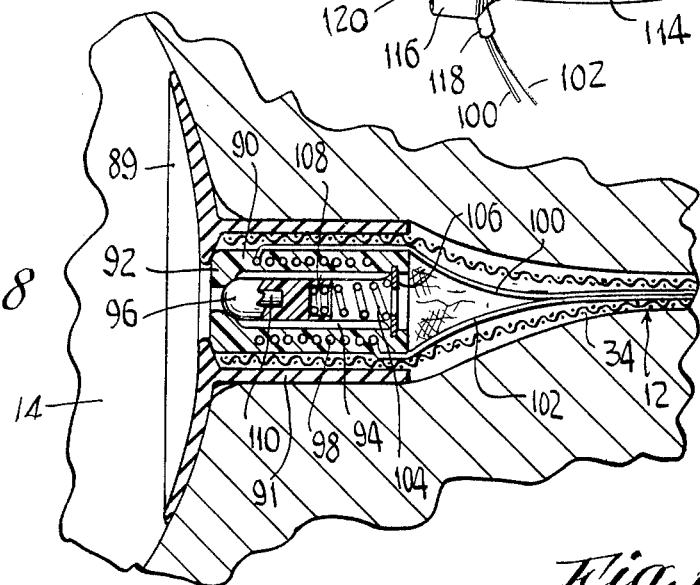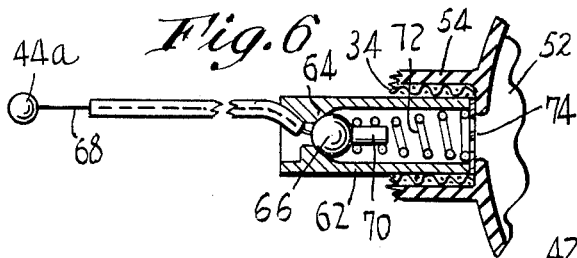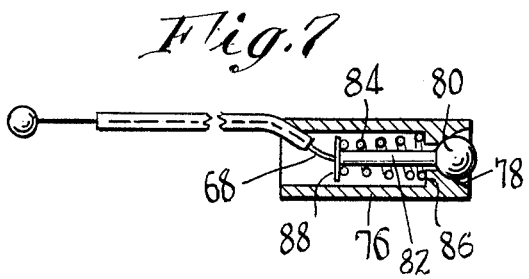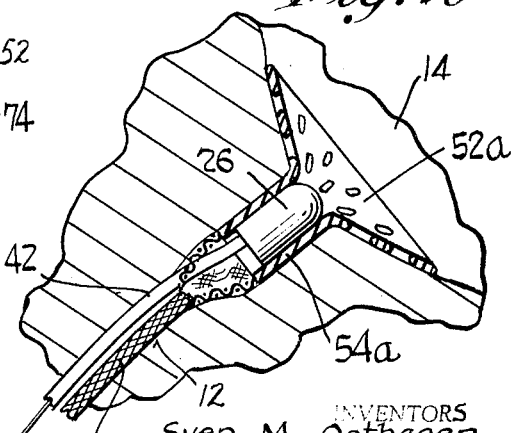

March 31, 1970  S. M. OSTHAGEN ET AL  3,503,400

URETHRAL VALVE

Filed July 12, 1967  3 Sheets-Sheet 3

INVENTORS
Sven M. Osthagen
Henry M. Wise, Jr.
BY

AGENT

ABSTRACT OF THE DISCLOSURE

An internally contained valved drainage-control device adapted to be retained in the urinary canal, comprising a tubular valve housing having a valve seat and cooperable valve. The housing mounts a collapsible annular retainer flange, and is adapted to be positioned in the canal with the flange occupying an adjoining space in the bladder. A porous elongate tether means such as a sheath of synthetic fibers is connected to the housing and extends through the canal to the exterior. The sheath acts as a tether for purposes of removal of the valve, and also provides a passage for the flow of liquid, permitting a natural flushing of the urethral wall when the valve is operated to the open position. The valve is operated either electrically or mechanically, by means of one or more wires extending to the exterior through or alongside the porous sheath.

CROSS REFERENCES

U.S. Patents Nos. 396,754; 1,878,671; 1,920,006; 2,024,982; 2,616,429.

BACKGROUND

This invention relates to drainage devices intended to be implanted in a living body, and more particularly to devices of this type, which are valve controlled.

Heretofore, various kinds of drainage devices, commonly known as catheters, draining probes, dilators, surgical instruments, etc. have been proposed and/or produced to cope with problems involving obstruction, operative procedures, examination of tissue, removal of fluids and the like. These prior devices were as a rule restricted in their use to the specific purpose originally in mind, and none could be satisfactorily utilized, for instance, as a fairly long term implant in the urethra or urinary tract to permit drainage of urine at will from the bladder. Such a long term drainage control device, moreover, is greatly needed and would find widespread use and acceptance.

It is known that patients who have neurogenic bladders due to congenital spinal cord defects, spinal cord or brain injury, or other neurologic diseases present a major economic problem because of persistent incontinence.

Also, patients who have incontinence of urination caused either by muscle weakness or post-operative surgical damage to the urinary sphincter, are candidates for a satisfactory, long term drainage device which could provide controlled periodic emptying of the bladder. Many such patients are not suitable for surgical correction of incontinence.

In addition, patients who have lower urinary tract obstruction, whose physical condition does not permit operative relief of this obstruction, can greatly benefit by having their bladder drained periodically by use of a long-term drainage control implant, until such time as operative intervention is permitted.

Efforts to meet and solve this long-standing problem have in general been directed toward the provision of an externally-carried reservoir or bag, in which the urine collected, to be periodically removed at the user's convenience. This type of device was, at the very best, a poor solution to the problem, for many quite obvious reasons not considered necessary to enumerate in connection withe the present invention.

SUMMARY

The above disadvantages and drawbacks of prior devices are obviated by the present invention, and one object of the invention is to provide a novel and improved self-operated, internally contained valved drainage control device which can be implanted in the urinary tract and readily retained therein for extended periods of time so as to effect urinary continence, thereby to successfully cope with the above-mentioned urinary problems arising from various causes. Another object is to provide a readily-operated valved drainage implant suitable for extended periods of use, which can be utilized in various, different locations in the body for the indicated purpose, being not restricted to the urinary tract.

These objects are accomplished by the provision of a novel valve means adapted to be disposed in the body, actuator means for the valve which includes at least one flexible wire, which either extends through or along the outside of an elongate pervious means, such as a cord or sheath of synthetic fiber mesh. The cord or sheath and the control cable or wire extend through the body passage to the external orifice. The porous cord or sheath enable an exchange and passage of liquids to occur, and facilitates drainage and natural functioning of the surrounding tissues whereby the likelihood of irritation, infection and incompatibility is greatly minimized, to the extent that the implant can be well tolerated without giving rise to undesired side effects.

Other objects of the invention are to provide an improved long-term drainage implant as above set forth, which is especially simple in construction, economical to fabricate and produce, small and compact, readily adaptable to both male and female patients, safe to use, and effective and reliable in operation; to provide an improved combination drainage implant and control belt, wherein the valve means of the implant may be operated from a convenient location on the belt, which latter is being worn by the user.

Yet other features and advantages will hereinafter appear.

In the drawings:

FIG. 1 is a fragmentary sagittal median section through a female pelvis showing the present improved valved drainage-control device in its implanted operative position extending through the urethra.

FIG. 2 is a fragmentary sagittal median section through a male pelvis, showing the valved drainage-control device in operative position, extending through the urethra.

FIG. 3 is a fragmentary section, enlarged, through the implanted mechanically operated drainage control device, enlarged to illustrate details of construction.

FIG. 4 is an axial sectional view through a pull-to-open valve means of the drainage control device, illustrating a modified form of the invention.

FIG. 5 is a plan view of a snap ring as utilized in the valve construction of FIG. 4.

FIG. 6 is a fragmentary axial sectional view of a push-to-open valve construction, illustrating another embodiment of the invention.

FIG. 7 is a fragmentary axial sectional view of another form of push-to-open valve construction for the drainage control device.

FIG. 8 is an enlarged, fragmentary sectional view taken through the axis of an electrically operated valve means for the drainage control device, constituting yet another embodiment of the invention.

FIG. 9 is a front perspective view of a control belt for use with the drainage control devices of the invention.

FIG. 10 is a view partly in axial section and partly in side elevation, of a control device constituting another embodiment of the invention.

Figure 11:
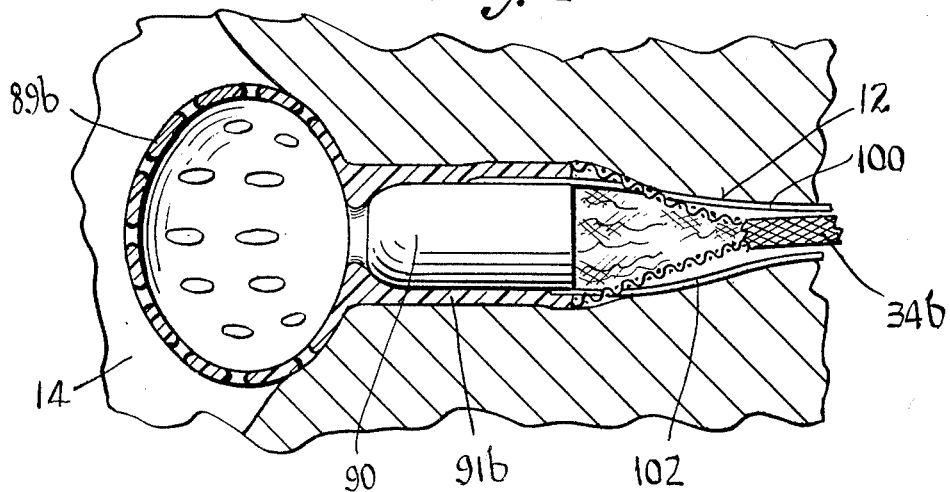
FIG. 11 is a part section, part elevational view of an electrically controlled device constituting yet another embodiment of the invention.

Considering first FIGS. 1–3, the drainage control device shown therein is designated generally by the numeral 10. In FIG. 1 the control device 10 is indicated as extending in and along the urethra 12 of a female person, said device communicating with the bladder 14 and extending to an exterior location designated by the numeral 16. In FIG. 2 the drainage control device 10 is shown as disposed in a male urethra 18 and communicating with the bladder 20, said device extending to an exterior location 22.

As seen in FIG. 3, the drainage control device 10 comprises a valve means 24 which is adapted to be disposed in the innermost portion of the urethral canal, adjoining the bladder 14. The valve means 24 comprises a tubular valve housing 26 having an interior valve seat 28 and a movable valve 30 which is cooperable with the seat 28. An actuator means is provided for the valve 24, comprising at least one slender flexible wire 32 which is adapted to extend through the body passage or urethra 12 to the exterior location 16. The valve housing 26 of FIG. 3 may be constituted of synthetic plastic substance, such as polypropylene, Teflon or the like.

The drainage control device 10 further comprises an elongate pervious means, such as a porous braid or sheath 34 which is preferably constituted of synthetic fibers, such as polypropylene, the braid or sheath being also preferably of woven construction. In the embodiment of the invention illustrated in FIGS. 1–8 the part 34 comprises a tubular woven sheath which surrounds the flexible wire 32, both extending through the body passage or urethra 12 from the valve means 24 to the exterior location 16.

The porous sheath 34 of synthetic fibers showns in FIGS. 1–8 has the important function of keeping the body tissues of the passage 12 out of contact with the wire 32 and with a conduit or guide means for such wire, shortly to be described. Further, the sheath 34 makes possible the safe retention of the drainage control device in the urethra for an extended period of time, as for example a number of months with assurance of positive removal of the device when desired at any later time by gently pulling on the sheath, which acts as a tether. The sheath 34 enables an important exchange and passage of liquids to occur whereby any undersirable side effects due to the continued presence of the implant are minimized, while at the same time it effectively isolates the wire 32 from the tissues of the urinary canal or passage. The sheath 34 effectively facilitates drainage and natural functioning of the tissues of the urethra, whereby the likelihood of irritation, infection and incompatibility is largely eliminated to the extent that the implant can be well tolerated without giving rise to undesired effects.

At its inner end the sheath 34 is securely attached to the valve housing 26. As seen in FIG. 3, the inner end portion of the sheath 34 extends around the exterior of the valve housing 26, and may be cemented or otherwise securely affixed to the housing, resisting separation even when subjected to considerable pulling forces.

The valve 30 is constantly yieldably urged against the valve seat 28 by a compression coil spring 36 extending around a hub 38 of the valve and engaging a snap ring 40 accommodated in a suitable interior annular groove in the housing 26. The actuator wire 32 constitutes a force-transmitting means for physically shifting the movable valve 30, and for this purpose the inner end of the wire 32 is securely affixed in the hub 38 of the valve.

Preferably, as shown, the actuator wire 32 extends through a conduit or guide tube 42 formed of flexible plastic substance such as polypropylene, said guide tube at its inner end portion being secured to the inside of the valve housing 26 and extending through the porous sheath 34 to the exterior location 16. By the provision of the guide tube 42 a smooth action or movement of the actuator wire 32 is had, whereby opening of the valve 30 may be readily effected in response to pulling the wire 32 so as to compress the spring 36 and shift the valve 30 away from the valve seat 28. To facilitate such operation, a finger piece 44 is affixed to the exterior end of the wire 32, as shown.

For the purpose of preventing the sheath 34 from creeping up into the urethra 12, a flexible annulus 46 is provided, to which the exterior end of the sheath 34 is secured, as by rolling the end portion around the annulus as indicated. The annulus may be of rubber composition, having imbedded in it a wire ring 48 provided with small bendable metal tines 50 projecting from the annulus. The tines 50 can be bent over the end portion of the sheath 34 and partially imbedded in the annulus 46 so that no sharp points protrude. This operation can be carried out by a suitable crimping tool, as will be understood.

Further, in accordance with the invention, a retainer and positioning device is provided in conjunction with the valve means 24. This retainer device comprises a collapsible soft rubber annulus or flange 52 which is securely attached to the valve housing 26. Preferably the flange 52 is integral with a tubular body portion 54 which extends around the valve housing 26 and also around the inner end portion of the porous sheath 34, being securely attached in the position illustrated. The retainer flange 52 is adapted to extend inside of the bladder 14 and to engage the walls thereof in the area of the inner mouth of the urethra 12. Thus, as will be understood from an inspection of FIG. 3, the flange 52 tends to prevent downward creeping or pullout of the valve device 24 and the sheath 34, together with the wire 32 and tube 42. The rubber body 54 may be cemented or otherwise securely attached to the inner end portion of the sheath 34 and to the valve housing 26, to become a permanent part thereof.

For the purpose of initially inserting the drainage control device in the patient, a rigid catheter is utilized. The drainage device 10 is forced inward through the catheter, with the flange 52 completely collapsed so as to occupy a relatively small diameter. The implanting of rubber catheters by means of a rigid catheter which is first introduced into the urethra is already known, and a similar technique may be utilized in placing the implant of the present invention in the patient.

It will now be understood from an inspection of FIGS. 1–3 that normally the valve means 24 remains closed. Because of the closely fitting flange 52 and body 54, cooperating with the urethra 12 and adjoining portions of the bladder 14, no undesired drainage from the bladder can occur. However, at the will of the patient, the valve 34 can be opened by pulling on the finger piece 44, whereby drainage of the bladder will occur through the valve housing 26 and the urethra 12. The porous, woven sheath 34 facilitates the flushing action on the urethra 12, and minimizes the likelihood of irritation and discomfort from the continual presence of the drainage control device.

Another embodiment of the invention is illustrated in FIG. 4. Parts already described are given similar characters. The embodiment of FIG. 4 is in many respects similar to that of FIG. 3, with the exception that the valve housing 26a in FIG. 4 is constituted of stainless steel, having an annular ribbed portion 58 to accommodate the snap ring 40. The valve housing 26a may have clamping lugs 60 adapted to be crimped around the inner end portion of the plastic tube 42, to securely attach the latter to the housing.

The valve means shown in FIGS. 1–4 is of the pull-to-open type. In FIG. 6 there is illustrated a push-to-open type valve construction for use with the drainage control device of the invention. In this figure, a tubular valve housing 62 of plastic substance has an internal valve seat 64 engaged by a valve 66 which is connected to a push wire 68. The valve 66 has a hub 70 around which there fits a compression coil spring 72 engaged at its other end with a perforated plate 74 secured over the inner end of the housing 62. With such construction the user pushes against the finger 44a so as to impart a pushing force to the wire 68, in order to effect opening of the valve. Other portions of the drainage control device which are similar to those already described in FIGS. 1–3 have been given similar numbers.

Another type of push-to-open valve construction for use with the drainage control device is illustrated in FIG. 7. Here, a tubular plastic valve housing 76 has a valve seat 78 which is engageable with a valve 80 having a shank 82 connected with the push wire 68. A compression coil 84 encircles the shank 82 and engages an internal shoulder 86 of the housing 76. The spring 84 also engages a shoulder 88 on the shank 82, thereby to yieldably hold the valve 80 in closing position against the valve seat 78, as will be understood.

Still another embodiment of the invention, wherein an electrically operated valve device is utilized, is shown in FIG. 8. Here the flange 89 carries a valve housing 90 in the tubular body 91. The housing 90 has a valve seat 92 and is constituted of molded plastic substance. The bore of the housing 90 has a plurality of molded, integral, longitudinally extending ribs 94. In the housing 90 there is slidably carried valve member 96 cooperable with the seat 92. The member 96 may comprise inert magnetic substance, whereby it also functions as a magnetic armature. Carried by, or imbedded in the walls of the valve housing 90 is an electrical coil 98 connected to lead wires 100, 102 to receive energization therefrom. The wires 100, 102 are preferably stranded and very flexible, being plastic-covered and extending through the porous sheath 34 so as to pass out the urethra 12. A valve return spring 104 in the bore of the valve housing 90 engages a split ring 106 at one end, the other end of the spring 104 being carried in a socket 108 of the valve-armature member 96. Instead of the valve-armature member 96 being constituted of a single piece of material, it may be formed of molded composition or synthetic susbtance with an imbedded magnetic slug 110, as shown. With the valve construction of FIG. 8, opening of the valve is effected by energization of the magnet coil 98 in consequence of passing a current through the lead wires 100, 102 as will be understood. When the energizing circuit is opened, the return spring 104 again closes the valve by holding the member 96 against the seat 92.

In FIG. 9 there is illustrated a control belt 114 adapted to be worn around the waist of the patient. At its front the belt 114 has a housing 116 adapted to contain a power source such as batteries, for connection to the wires 100, 102 through a suitable detachable plug fitting 118. A lockable push button switch 120 is carried by the housing 116, for closing or opening the circuit through the magnet coil 98 by de-energizing or energizing the wires 100, 102.

In FIGS. 1–8 the wire control means is shown as being contained inside the fibrous sheath or braid. The wire control can, as well, be disposed along the outside of the sheath or braid. Such an arrangement is illustrated in FIG. 10. Here a woven braid or cord 34a has its inner end enlarged and secured to the annular edge of the tubular body 54a of the flange 52a. The body 54a and flange 52a may be of rubber or rubber-like material, or of plastic. The flange 52a in FIG. 10 is shown as having perforations. These reduce the mass and promote yieldability as well as permitting passage of liquids and enabling underlying tissue to be exposed.

The guide tube 42 passes through the cord 34a so as to extend along the outside of the same, in the urethra. The valve body 26 and interior details are similar to those already described.

In place of a retainer flange as set forth in FIGS. 1–8 and 10, a bulbous or "balloon" type retainer can be utilized. This is illustrated in FIG. 11, wherein the electrically-controlled valve housing 90 is carried in a tubular body 91b having a perforated bulbous portion 89b. The body 91b has attached to its annular end the enlarged end of the woven cord 34b. Passing through said enlarged end are the control wires 100 and 102. Thus, the wires 100 and 102 are exterior to the cord 34b as these extend through the urethra.

Figure 12:
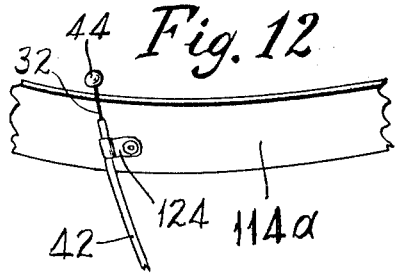
FIG. 12 is a fragmentary perspective of a belt with mechanical control.

A means to enable actuation of the mechanically controlled valve is shown in FIG. 12. The belt 114a mounts the operating end of the pull wire 32 and guide tube 42, by means of a snap fastener fitting 124. With such arrangement, the fitting 124 is quickly separable from the belt or strap 114a at the convenience of the wearer. To actuate the valve 30, the user merely pulls on the finger piece 44, as will be now apparent.

It will now be understood from the foregoing that we have provided a novel and improved valved drainage control device which is adapted to be implanted in the passage of a living body for the purpose of shutting off or allowing the flow of liquid from the body through said passage, said device being especially constituted to remain for an extended period of time with a minimum of discomfort, irritation or other undesired side effects. The control device is seen to be of simple construction, involving relatively few parts which may be economically fabricated and assembled.

The device is effective and reliable in its operation, and can overcome the disability of patients who are afflicted with urinary incontinence.

Variations and modifications may be made within the scope of the claims, and portions of the improvement may be used without others.

We claim:

1. A valved drainage-control device adapted to be implanted in a passage of a living body for the purpose of shutting off or allowing the flow of liquid from the body through said passage, comprising in combination:
   (a) valve means adapted to be disposed in said body for controlling liquid flow through said passage, said valve means including a valve housing having a valve seat and a movable valve cooperable with said seat,
   (b) actuator means for said valve, including at least one slender, flexible wire adapted to extend through said body passage to the exterior of the body,
   (c) an elongate liquid-porous and pervious fibrous tether means providing a passage for the flow of liquid, said tether means extending along said flexible wire and being adapted to extend through the body passage to the exterior,
   (d) one end of said tether means being securely connected to the valve means,
   (e) the porosity of said fibrous tether means permitting a natural flushing of the urethral wall when the valve is actuated to the open position.

2. A valved drainage-control device as in claim 1, wherein:
   (a) the flexible wire is attached to the valve and constitutes a force-transmitting means for physically shifting the movable valve.

3. A valved drainage-control device as in claim 2, wherein:
   (a) spring means are provided, for yieldably holding the valve against its valve seat.

4. A valved drainage-control device as in claim 3, wherein:

(a) a flexible tubular sheath is disposed around the wire, said tubular sheath constituting a guide for the wire.

5. A valved drainage-cotnrol device as in claim 3, wherein:
(a) the flexible wire is attached to the valve to pull the same away from its seat.

6. A valved drainage-control device as in claim 3, wherein:
(a) the flexible wire is attached to the valve to push the same away from its seat.

7. A valved drainage-control device as in claim 1, wherein:
(a) the actuator means comprises an electromagnet connected to the valve, and a circuit therefor comprising the said slender, flexible wire.

8. A valved drainage-control device as in claim 1, wherein:
(a) the pervious tether means extends around and is secured to the valve housing.

9. A valved drainage-control device as in claim 1, wherein:
(a) there is a retainer device comprising a collapsible flange secured to the valve housing and adapted to occupy a cavity in the body, for yieldably holding the valve means in place.

10. A valved drainage-control device as in claim 9, wherein:
(a) the flange is molded of soft rubber-like substance and is dish-shaped,
(b) an end portion of the pervious tether means being secured to said flange.

11. A valved drainage-control device as in claim 9, wherein:
(a) the retainer device comprises a tubular body extending around and secured to the valve housing.

12. A valved drainage-control device as in claim 11, wherein:
(a) the pervious tether means extends between the tubular body and valve housing.

13. A valved drainage-control device as in claim 12, wherein:
(a) the collapsible flange and tubular body of the retainer device are molded of soft rubber.

14. A valved drainage-control device as in claim 1, wherein:
(a) an annular abutment member is secured to the exterior end of the porous tether means to prevent shifting of the same inwardly into the said passage,
(b) said member extending around the outer end portion of the flexible wire.

15. A valved drainage-control device as in claim 1, wherein:
(a) the pervious tether means comprises a woven sheath of synthetic fibers extending around the wire for the purpose of keeping body tissue out of contact with the wire.

16. A valved drainage-control device as in claim 1, wherein:
(a) the wire extends along the outside of the pervious tether means.

17. A valved drainage-control device as in claim 1, wherein:
(a) there is a retainer device comprising a collapsible perforated bulb secured to the valve housing and adapted to occupy a cavity in the body, for yieldably holding the valve means in place.

References Cited

UNITED STATES PATENTS

| | | | |
|---|---|---|---|
| 396,754 | 1/1889 | Mayfield | 128—349 |
| 1,920,006 | 7/1933 | Dozier | 128—349 |
| 2,547,758 | 4/1951 | Keeling | 128—349 |
| 2,687,731 | 8/1954 | Iarussi et al. | 128—349 |
| 2,855,932 | 10/1958 | Stubbs | 128—260 |
| 3,331,371 | 7/1967 | Rocchi et al. | 128—349 |
| 3,344,791 | 10/1967 | Foderick | 128—349 |
| 3,419,008 | 12/1968 | Plishner | 128—346 |

DALTON L. TRULUCK, Primary Examiner